(12) United States Patent
Schroeder et al.

(10) Patent No.: US 6,904,192 B2
(45) Date of Patent: Jun. 7, 2005

(54) LATCHING BUBBLE FOR FLUID-BASED OPTICAL SWITCH

(75) Inventors: Dale W. Schroeder, Scotts Valley, CA (US); John J. Uebbing, Palo Alto, CA (US)

(73) Assignee: Agilent Technologies, Inc, Palo Alto, CA (US)

(*) Notice: Subject to any disclaimer, the term of this patent is extended or adjusted under 35 U.S.C. 154(b) by 191 days.

(21) Appl. No.: 10/266,307

(22) Filed: Oct. 7, 2002

(65) Prior Publication Data

US 2004/0067012 A1 Apr. 8, 2004

(51) Int. Cl.[7] ................................................. G02B 6/35
(52) U.S. Cl. ................................ 385/18; 385/16; 385/19
(58) Field of Search ...................................... 385/14–24

(56) References Cited

U.S. PATENT DOCUMENTS 6,188,815 B1 * 2/2001 Schiaffino et al. ............ 385/16

* cited by examiner

Primary Examiner—Akm Enayet Ullah
Assistant Examiner—Kevin S. Wood

(57) ABSTRACT

An optical switch having liquid or bubbles in switching sites operates with a fluid pressure less than the vapor pressure of the liquid. This pressure differential is equal to the surface tension induced pressure drop across a bubble having a critical size selected according to switching site geometry. Each switching site has a stable state including a bubble larger than the critical size and another stable state with no bubble. Local heating provides nucleation energy to create a bubble but is not required to maintain the bubble. Globally or locally increasing the fluid pressure collapses bubbles in switching sites to reset all or selected switching sites. One switching site creates rapidly expanding bubbles near but outside the optical cavity of the switching site. The bubble's expansion causes liquid flow that locally increases pressure and collapses a bubble in the optical cavity or pushes the bubble from the optical cavity into an absorber cavity.

31 Claims, 8 Drawing Sheets

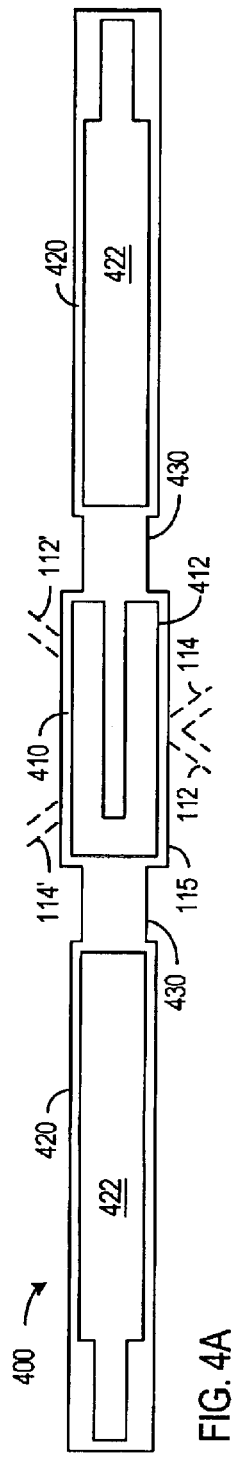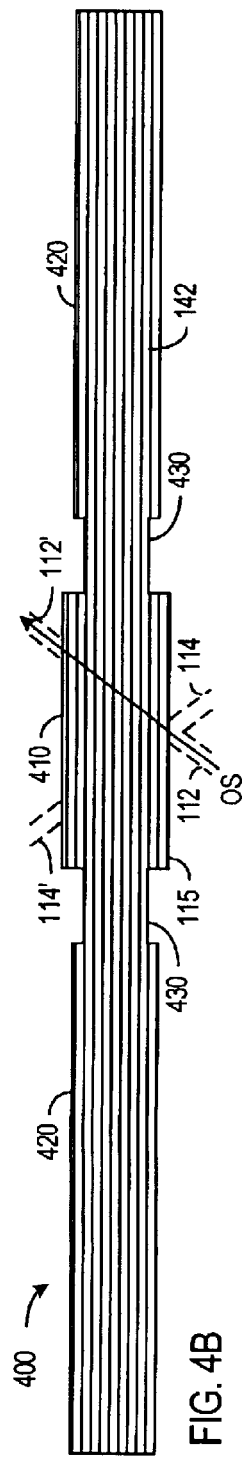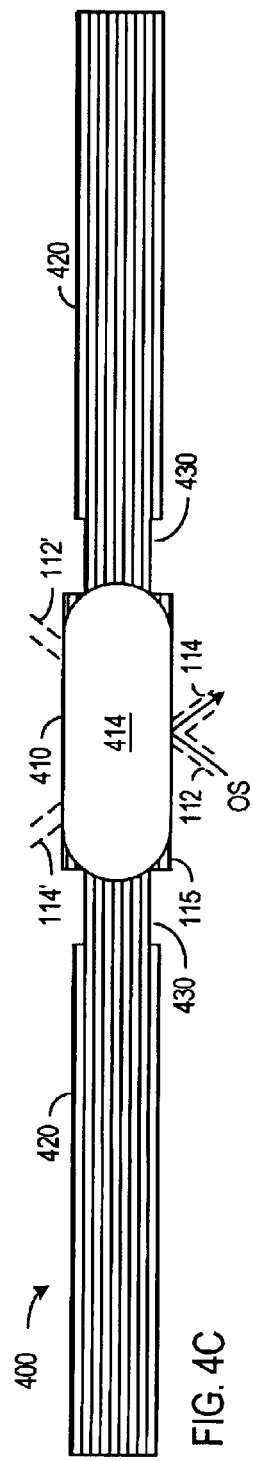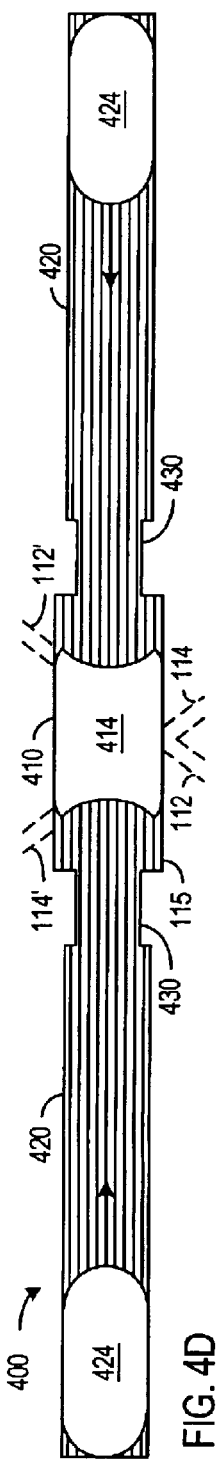

LATCHING BUBBLE FOR FLUID-BASED OPTICAL SWITCH

BACKGROUND

Optical switches, which can directly manipulate optical signals, are becoming increasingly important for optical networking. Accordingly, several techniques for switching optical signals have been developed. FIG. 1 shows a plan view of an optical switch 100 that uses some of the optical switching techniques described in U.S. Pat. No. 5,699,462 to Fouquet et al., entitled "Total Internal Reflection Optical Switches Employing Thermal Activation." As illustrated in FIG. 1 and in the cross-sectional views of FIGS. 2A and 2B, optical switch 100 includes a planar lightwave circuit 110, a semiconductor substrate 120, a base plate 130, and a reservoir 140.

Planar lightwave circuit 110 is a plate of an optical material such as quartz containing crossing waveguide segments 112 and 114 and cavities 116 at the intersections of waveguide segments 112 and 114. Optical signals are generally input to optical switch 100 on one set of waveguide segments 112 or 114, and cavities 116 act as switching sites for the optical signals. In particular, a cavity 116 when filled with a liquid 142 having a refractive index matching the refractive index of the waveguide segments 112 and 114 transmits an optical signal from an input waveguide segment 112 or 114 into the next waveguide segment 112 or 114 along the same path. FIG. 2A shows a cavity 116 filled with liquid 142 from reservoir 140.

A cavity 116 becomes reflective for switching or redirection of an optical signal when the cavity contains a bubble. More specifically, total internal reflection at an interface 115 between an input waveguide 112 or 114 and a bubble 146 (as shown in FIG. 2B) switches an optical signal into a crossing waveguide segment 114 or 112. Selectively activating or making reflective one of the cavities 116 along the initial path of an optical signal can switch the optical signal onto any of the crossing waveguide segments 114 or 112. If none of the cavities 116 along the path of an optical signal are reflective, the optical signal passes straight through optical switch 100.

Semiconductor substrate 120 contains electronic circuitry that includes heating elements 122 positioned in cavities 116. Selective activation of a heating element 122 vaporizes liquid in the corresponding cavity 116 and makes reflective the switching site corresponding to the cavity 116 containing the activated heating element 122. The activated heating element 122 then continues heating to keep the bubble stable and the switching site reflective. If the heating element 122 is turned off, bubble 146 and surrounding liquid 142 cool, causing bubble 146 to collapse and the cavity 116 to refill with liquid 142.

Base plate 130 acts as a heat sink for semiconductor chip 120 but also includes an inlet 136 connected to reservoir 140. Inlet 136 and a hole 126 through semiconductor substrate 120 allow liquid 142 to flow between reservoir 140 and a gap 118 underlying cavities 116. When a bubble 146 forms or collapses to activate or deactivate a switching site, liquid 142 flows to or from reservoir 140 via gap 118, hole 126, and inlet 136.

Reservoir 140 is partially filled with liquid 142 and partially filled with a gas 144, typically vapor from liquid 142. The pressure of gas 144 controls the fluid pressure of liquid 142 and therefore controls the difficulty of forming bubbles in cavities 116. U.S. Pat. No. 6,188,815 issued Feb. 13, 2001 to Schiaffino et al., entitled "Optical Switching Device and Method Utilizing Fluid Pressure Control to Improve Switching Characteristics," describes how a pressure controlling mechanism in reservoir 140 can elevate the pressure of liquid 142 to avoid inadvertent formation of bubbles that might cause improper switching in switch 100.

Optical switches similar to switch 100 have proven effective for switching optical signals. However, improvements are sought in several areas. Energy consumption, for example, in switch 100 can be significant when several switching sites are simultaneously reflective. To keep a switching site reflective, the corresponding heating elements 122 must locally maintain a temperature high enough to prevent collapse of the bubble 146 in the overlying cavity 116. This constant drain of energy continues even when the routing of optical signals through optical switch 100 remains constant. The energy consumption also generates heat that can be difficult to dissipate, particularly in compact optical switches having a high density of heating elements 122. The heating, being localized to small areas, can lead to damage and failure of electronic circuitry. For a practical device having a commercially useful lifetime, the amount of heating must be limited which in turn limits the types of liquid that an optical switch can use. Specifically, some liquids require too much heating to create and maintain a bubble and cause conventional heating elements to burn out quickly.

Another concern for optical switch 100 is condensation and distillation that can occur in cavities 116 containing bubbles 146. Each bubble 146 is kept at a locally elevated temperature to maintain the vapor pressure inside bubble 146 and thereby prevent bubble 146 from collapsing. The heated vapor in the bubble 146 can condense onto the cooler walls of the cavity 116. Condensation at interface 115 between a cavity 116 and an input waveguide segment 112 or 114 can cause off-angle reflection, resulting in signal loss when less of the optical signal reflects into the desired output waveguide segment 114 or 112 and resulting in noise or cross-talk if part of the optical signal enters other waveguide segments.

Evaporation and condensation can also cause local fractional distillation when liquid 142 contains two or more separable compounds. The fractional distillation can locally change the composition and therefore the refractive index of liquid 142. Having matching refractive indices for liquid 142 and waveguide segments 112 and 114 is critical to avoiding intolerable levels of reflection at switching sites intended to be transparent. The distillation problem limits the suitable choices for liquid 142 to liquids that resist distillation that changes the liquid's refractive index.

In view of the limitations in existing optical switches, there is a need for structures and operating methods that expand the choices for suitable liquids in optical switches and reduce power consumption and heat generation in optical switches.

SUMMARY

In accordance with an aspect of the invention, an optical switch operates with a liquid at a pressure and temperature such that the vapor pressure of the liquid at the operating temperature is greater than the fluid pressure. The difference between the vapor pressure and the fluid pressure is selected so that the surface tension of bubbles in the liquid causes small bubbles to collapse and larger bubbles to expand. The threshold bubble dimension that distinguishes whether a bubble collapses or expands is larger than the smallest dimension of liquid layers and channels between optical cavities but smaller than the smallest dimension of an optical cavity. In this operating regime, a bubble in an optical cavity is stable without local heating. The bubbles in the optical cavities cannot expand outside the optical cavities because surface tension collapses any portion of a bubble having a dimension as small as the fluid layer or channels leading from the optical cavities.

The homogeneous nucleation temperature of the liquid provides an energy barrier that prevents spontaneous formation of bubbles in the optical cavities. To form a bubble at an optical cavity, local heating temporarily applied to the liquid adds the energy required to create a bubble. The bubbles can be created directly in the optical cavities or can expand from an adjacent location into the optical cavity. After reaching the critical size in an optical cavity, the bubble expands to fill the optical cavity and remains even after the heating stops.

To shut off switching sites, a temporary global increase in the fluid pressure can simultaneously collapse all bubbles in the optical cavities and reset an optical switch to a state where all switching sites are transparent. Alternatively, local pressure increases can selectively collapse bubbles in individual optical cavities to deactivate selected switching sites while other switching sites remain reflective. Bubble creation near an optical cavity will locally increase fluid pressure, cause fluid flow into the optical cavity, and collapse a bubble in the optical cavity. Another alternative method for shutting off an individual switching site creates a flow of liquid that pushes a bubble out of the optical cavity into a location such as an absorber cavity that traps and/or absorbs the bubble.

An optical switch employing aspects of the invention can be energy efficient because the optical switch only requires local heating to activate or deactivate switching sites and does not require local heating to maintain the activated sites. The state of a switching site is thus latched or non-volatile in that the state remains without local heating or energy consumption as long as the liquid in the optical switch remains in the desired pressure-temperature regime. Avoiding constant local heating will also extend the useful life of the electronic components in the optical switch.

A further advantage of an optical switch operating in the target pressure and temperature regime is that the optical switch keeps the bubbles in reflective switching sites at the same temperature as the surroundings (e.g., at the same temperature as a planar light-wave circuit) thereby avoiding condensation on cavity walls and local distillation of the liquid. As a result, switching sites provide cleaner reflections and have higher reflective signal-to-noise ratios (SNRs). Further, liquids containing mixtures of compounds can be more readily used to improve the match between the refractive indices of the liquid and the waveguides in the optical switch.

One specific embodiment of the invention is an optical switch including an optical structure enclosing a liquid. The optical structure includes crossing optical paths and cavities at intersections of the optical paths. The liquid, which has an index of refraction matching an index of refraction of the optical paths, is in communication with the cavities through channels and has a fluid pressure less than the vapor pressure of the liquid. The difference between the fluid pressure and the vapor pressure is generally greater than the surface tension of a bubble filling one of the cavities but less than the surface tension of a smaller bubble having a size corresponding to a dimension of the channels. The optical switch can maintain the optical structure and the liquid at the same uniform temperature and still have the liquid filling some of the cavities while bubbles are in other cavities.

In accordance with another aspect of the invention, switching sites in an optical switch have structures that permit switching individual switching sites to or from the state containing a bubble. One such switching site structure includes an optical cavity that reflects or transmits optical signals and one or more activation cavities used in switching the optical cavity between its reflective and transparent states. Each activation cavity is in fluid communication with the optical cavity and contains an activation device such as a heating element. The activation device forces liquid from the activation cavity into the optical cavity. A pulsed operation of a heating element in an activation cavity, for example, can deactivate a switching site by creating a bubble in the activation cavity that rapidly expands to force liquid from the activation cavity into the optical cavity. The fluid flow can crush or collapse the bubble in the activation cavity or alternatively push the bubble out of the optical cavity. The switching site may include a larger stable bubble in an absorber cavity into which the bubble from the optical cavity can be pushed. A heating element in the optical cavity or sustained operation of heating elements in activation cavities can create a bubble in the optical cavity.

Another embodiment of the invention is a method for operating an optical switch. The method generally includes filling a cavity that is at an intersection of light paths with a liquid, creating a bubble in the cavity, and then maintaining the liquid at a temperature and a fluid pressure such that the bubble is stable without local heating. The fluid pressure of the liquid is thus less than the vapor pressure of the liquid at the operating temperature of the liquid and the cavity. This operating regime provides switching sites in the optical switch with two stable states, one with a bubble and one without a bubble.

Locally heating the liquid in the cavity or in adjacent areas can heat the liquid to a temperature above the homogeneous nucleation temperature of the liquid and create a bubble in the cavity. The pressure and the temperature of the liquid are such that the bubble remains stable after local heating stops.

Temporarily increasing the pressure of the liquid in the cavity can collapse the bubble in the cavity. The cavity then remains filled with liquid when the liquid returns to the normal operating regime. The pressure can be temporarily increased globally to reset the entire optical switch by increasing fluid pressure in a reservoir that is in fluid communications with all switching sites in the optical switch. Alternatively, locally increasing the fluid pressure without changing fluid pressure at the other switching sites can deactivate only selected switching sites.

A fluid flow from an adjacent activation cavity into an optical cavity can increase the pressure and collapse a bubble in the optical cavity. Such fluid flow can push the bubble out of the cavity as an alternative technique for changing an optical cavity from the state with a bubble in the cavity to the state where liquid fills the cavity. Pushing a bubble out of the optical cavity may provide faster switching when the bubble contains impurity gases that must dissolve into the liquid when the bubble collapses. An absorber cavity containing a large stable bubble can receive the bubbles pushed out of the optical cavities and can hold gases for the time required to reach equilibrium with the liquid.

BRIEF DESCRIPTION OF THE DRAWINGS

FIGS. 4A, 4B, 4C, and 4D are plan views respectively illustrating the structure of a switching site, a transparent state of the switching site, a reflective state of the switching site, and a process for changing the switching site from the transparent state to the reflective state in an embodiment of the invention that collapses individual bubbles to deactivate switching sites.

Use of the same reference symbols in different figures indicates similar or identical items.

DETAILED DESCRIPTION

In accordance with an aspect of the invention, an optical switch containing a liquid operates the liquid at a pressure and a temperature that maintains bubbles having the size of optical cavities but collapses smaller bubbles (e.g., having the size of fluid channels). As a result, a bubble once created in an optical cavity remains stable without local heating to maintain the bubble. A reset operation can globally increase the fluid pressure in the optical switch to collapse all previously formed bubbles. Alternatively, local changes in the fluid pressure can collapse selected bubbles, or fluid flows can push selected bubbles out of optical cavities to deactivate selected switching sites while other switching sites remain active.

Figure 1:
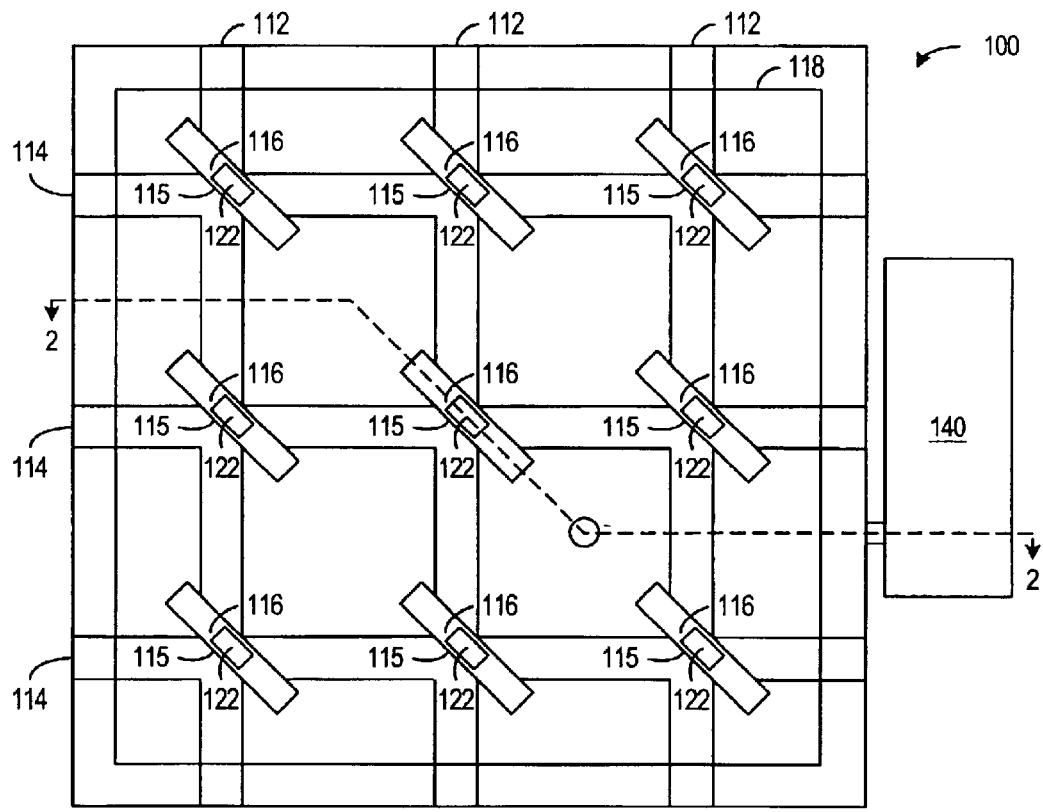
FIG. 1 shows a plan view of an optical switch.
Figure 2A:
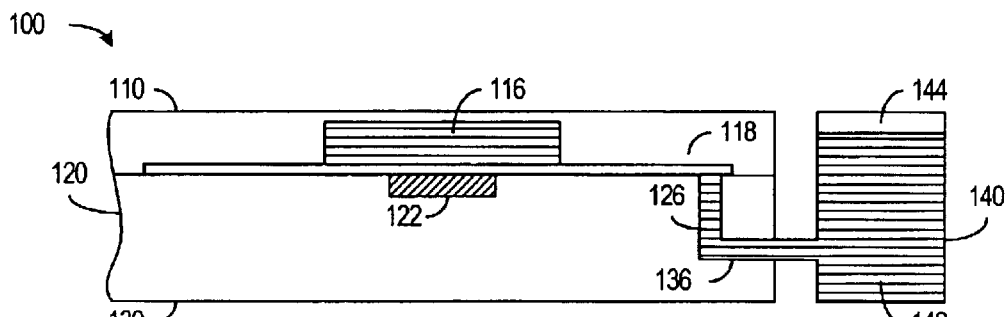
FIGS. 2A and 2B show cross-sectional views of the optical switch of FIG. 1 respectively without and with a reflective switching site.
Figure 2B:
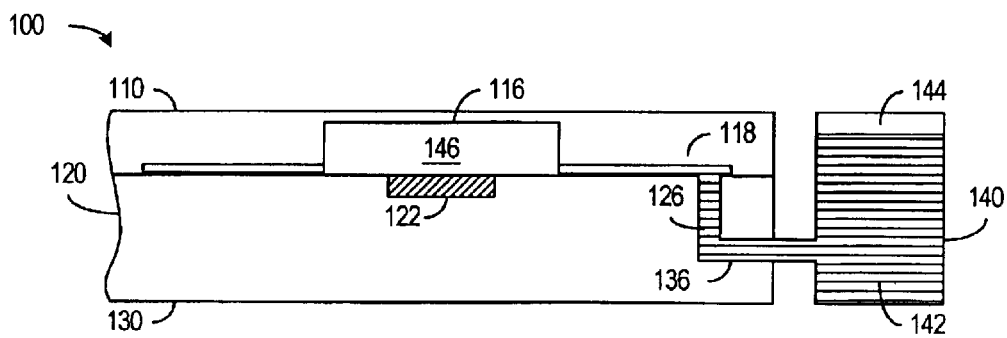
Figure 3A:
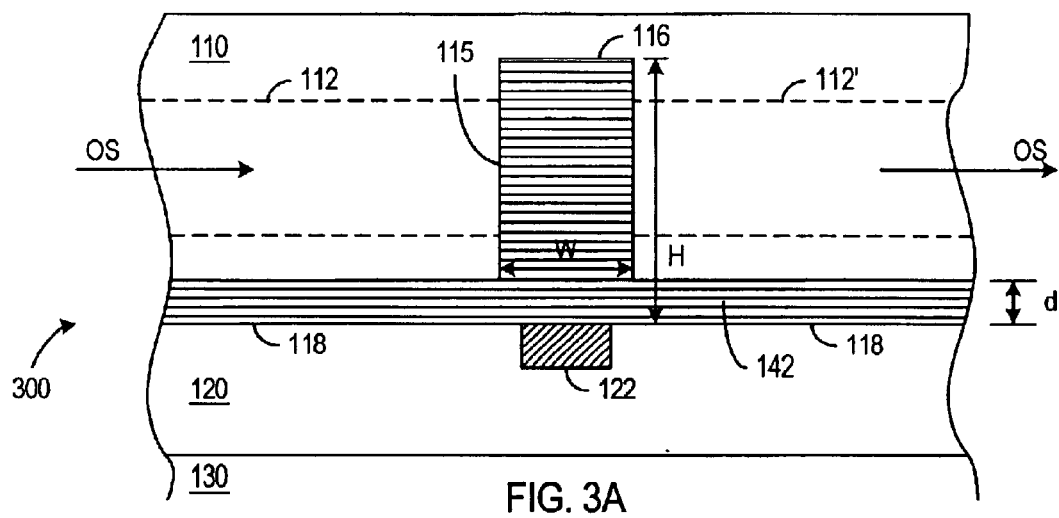
FIGS. 3A, 3B, and 3C are cross-sectional views of a switching site and illustrate a bubble creation process in accordance with an embodiment of the invention.
Figure 3B:
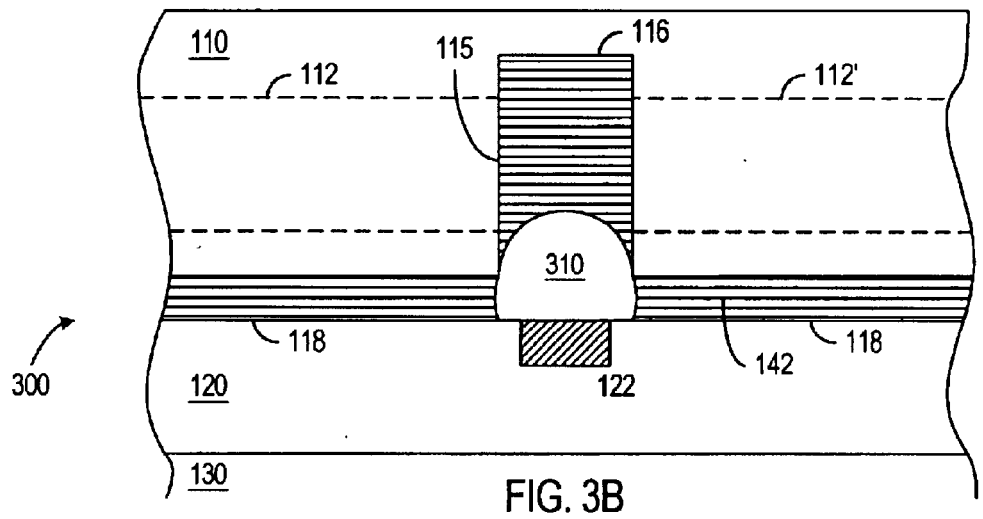
Figure 3C:
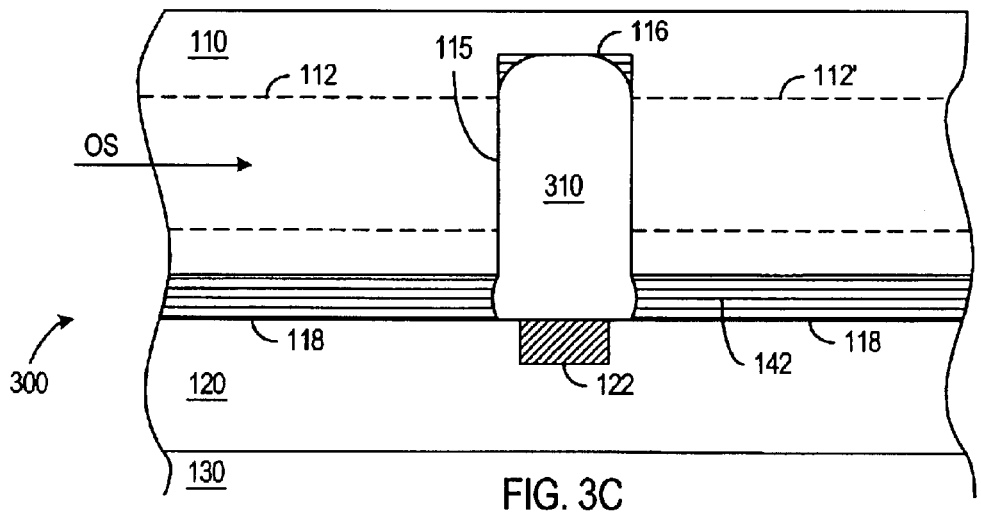

FIGS. 3A, 3B, and 3C show cross-sectional views of a switching site 300 in an optical switch such as optical switch 100 illustrated in FIGS. 1, 2A, and 2B. Switching site 300 includes a cavity 116 formed between a planar lightwave circuit 110 and an underlying semiconductor substrate 120. Waveguide segments 112 and 112' have a higher refractive index than does surrounding portions of planar lightwave circuit 110 and serve to guide optical signals in planar lightwave circuit 110. Generally, the optical switch and switching site 300 can be structurally identical to existing optical switches and switching sites except for the fluid pressure or temperature and operating methods disclosed herein. Switching site 300 may alternatively have cavities and/or fluid channels that are sized and/or shaped for the pressure and temperature regimes and the operating methods disclosed herein.

When switching site 300 is transparent as shown in FIG. 3A, optical cavity 116 is filled with a liquid 142 having an index of refraction matching the index of refraction of input waveguide 112. Liquid 142 is typically an organic solvent such as fluorobenzene, but any liquid providing the required index of refraction and suitable chemical and physical properties could be used. Input waveguide segment 112 guides an optical signal OS that passes through liquid 142 in cavity 116 to a following waveguide segment 112' that is collinear with input waveguide segment 112. Matching the index of refraction of liquid 142 to the index of refraction of waveguide segment 112 avoids partial reflection of optical signal OS at interface 115 between waveguide segment 112 and liquid 142 in FIG. 3A.

In accordance with an aspect of the invention, the operating temperature T0 of liquid 142 and surrounding components of the optical switch and the fluid pressure Pe of liquid 142 are such that the vapor pressure Pv of the liquid at the operating temperature of the optical switch is greater than the fluid pressure Pe. In optical switch 100 of FIG. 1, having reservoir 140 at a temperature lower than the temperature of planar lightwave circuit 110, semiconductor substrate 120, and base plate 130 can provide the desired negative pressure differential between fluid pressure Pe as maintained in reservoir 140 and vapor pressure Pv of liquid 142 at the operating temperature of cavities 116. A temperature difference of about 7° C. between reservoir 140 and the rest of the optical switch can provide a negative pressure differential of about 3,800 Pa for a liquid such as fluorobenzene.

Contrary to what might be expected at first consideration, the liquid filled state of cavity 116 is a stable state of cavity 116 since a bubble will not form unless sufficient heat is input to overcome the homogeneous nucleation temperature for bubble formation in the liquid. Typically, the nucleation energy for a liquid is about 89% of the critical temperature of the liquid. (The critical temperature is the temperature at which pressure is unable to maintain the liquid state and is about 287° C. for fluorobenzene.) Accordingly, if switching site 300 is filled with liquid 142 as shown in FIG. 3A and kept below the homogeneous nucleation temperature of liquid 142, the liquid filled state of switching site 300 will be stable even when the fluid pressure Pe is less than the vapor pressure Pv of liquid 142.

Heating of liquid 142 in switching site 300 to a temperature above the nucleation temperature forms a bubble 310 such as illustrated in FIG. 3B. After formation, bubble 310 expands or collapses depending on the balance between the vapor pressure Pv' inside bubble 310, the external fluid pressure Pe on bubble, and the surface tension σ of the bubble. In particular, bubble 310 expands if outward vapor pressure Pv' during bubble formation is greater than the sum of the inward external fluid pressure Pe and the surface tension σ induce pressure and contracts if outward vapor pressure Pv' is less than the sum of the inward external fluid pressure Pe and the surface tension σ induced pressure. When the bubbles settles into equilibrium with its surroundings, the bubble is at the operating temperature of the optical switch, and the vapor pressure Pv' in the bubble is equal to the vapor pressure Pv of the liquid 142.

The surface tension induce pressure Pσ, which given by σC where C is the total curvature in both directions for a bubble, is generally a function of the radius of curvature of the bubble's surface and decreases as the radius of curvature of the bubble's surface increases. If the external fluid pressure Pe is less than the equilibrium vapor pressure Pv at the operating temperature T0 of the liquid, a critical bubble radius R0 or diameter D0 can be found where the inward and outward forces on a bubble balance as indicated in Equation 1. Bubbles and portions of bubbles having a radius of curvature less than a critical radius R0 collapse, and bubbles having a radius greater than the critical radius R0 expand to fill the available space.

$$Pv = Pe + \sigma C \qquad \text{Equation 1:}$$

In accordance with an aspect of the invention, optical cavity 116 has a smallest dimension (length, width W, or height H) that is larger than critical diameter D0, and gap 118 has a dimension d (e.g., height or width) that is smaller than critical diameter D0. In one exemplary embodiment of the invention using fluorobenzene as liquid 142 and a difference of about 7° C. between the temperature of the reservoir and the operating temperature T0, the resulting fluid pressure difference Pv−Pe is about 3,800 Pa, and critical diameter D0 is about 14 μm. For this embodiment, an optical cavity 116 having respectively height H, width W, and length of about 45 μm, 15 μm, and 45 μm can hold a stable bubble, but a gap 118 having a height of about 5 μm cannot.

FIG. 3B illustrates an activation process during which heating element 122 heats a portion of liquid 142 in cavity 116 to above the nucleation temperature for a short period of time to create bubble 310. Bubble 310 quickly expands to a diameter greater than critical diameter D0. When local heating of liquid 142 stops, the vapor in bubble 310 cools to the operating temperature T0 of liquid 142. Unlike in prior optical switches, bubble 310 does not collapse when local heating stops. Instead, bubble 310 after reaching the critical diameter D0 continues to expand in optical cavity 116 whether or not local heating is applied.

FIG. 3C shows switching site 300 in the activated or reflective state where bubble 310 fills optical cavity 116. Since the dimensions of cavity 116 are all larger than the critical diameter D0, the surface tension of fully-expanded bubble 310 is too small to overcome the difference between vapor pressure Pv in bubble 146 and the fluid pressure Pe around bubble 310. Bubble 310 cannot extend into gap 118 because at the smaller dimensions of gap 118, the surface tension overcomes the pressure difference Pv−Pe and collapses the extension. Bubble 310 is thus confined to the selected cavity 116. The confinement of bubble 310 allows activating only selected switching site 300, without unintentionally activating other switching sites.

Bubble 310 of FIG. 3C is at the same temperature T0 as the surrounding components of the optical switch and particularly at the same temperature as planar lightwave circuit 110. As a result, vapor in bubble 310 does not condense on the walls of cavity 116. Interface 115, which is at one of the walls of optical cavity 116, can thus cleanly reflect incident optical signal OS from waveguide segment 112 to a waveguide segment 114 (not shown in the view of FIG. 3C) at the reflection angle relative to waveguide segment 112. The lack of condensation also avoids fractional distilling of liquid 142 that could otherwise separate component compounds of liquid 142 when liquid 142 is a mixture.

After being created, bubble 310 remains in optical cavity 116 without further local heating of the switching site 300. To deactivate switching site 300, the external fluid pressure Pe can be increased relative to the vapor pressure Pv, so that the external pressure Pe and surface tension σ overcome the vapor pressure Pv and collapse bubble 310. Increasing fluid pressure Pe by about 5,000 Pa above the vapor pressure is sufficient to collapse bubbles in less than about 1 ms. In optical switch 100, heating sealed reservoir 140, cooling planar lightwave circuit 110 and substrate 120, or mechanically decreasing the volume of reservoir 140 can increase the external fluid pressure Pe surrounding bubbles 310, causing the bubbles to collapse. U.S. Pat. No. 6,188,815 further describes methods and structures for controlling fluid pressure in an optical switch.

FIG. 4A is a plan view of a switching site 400 in accordance with an embodiment of an optical switch capable of selectively activating and deactivating individual switching sites. An optical switch in accordance with the invention can be the same as optical switch 100 of FIG. 1 but with switching sites that are substantially identical to switching site 400 in place of optical cavities 116.

Switching site 400 includes an optical cavity 410 and activation cavities 420 formed in and between a planar lightwave circuit and an underlying semiconductor substrate. Wave guide segments 112 and 114 in the planar lightwave circuit end at interface 115, which is a front wall of optical cavity 410, and waveguide segments 112' and 114' extend from a back wall of optical cavity 410 along the directions of waveguide segments 112 and 114, respectively. Optical cavity 410 operates to transmit or reflect an input optical signal in the same manner described above for optical cavities 116 of FIG. 1. A heating element 412 in optical cavity 410 is optional, and can be used to activate (i.e., make reflective) switching site 400. In an exemplary embodiment, optical cavity 410 has a length of about 45 μm, a width of about 15 μm, and a height of about 45 μm.

Activation cavities 420 are in fluid communication with optical cavity 410 via respective necks 430. In the exemplary embodiment of the invention, each activation cavity 420 has a length of about 85 μm, a width of about 12 μm, and a height of about 45 μm, and each neck 430 is about 10 μm long, 9 μm wide, and 45 μm high. Each activation cavity 420 contains a heating element 422 for processes that switch switching site 400 between a reflective state and a transparent state of switching site 400.

FIG. 4B illustrates the transparent state of switching site 400. In the transparent state, switching site 400, and particularly optical cavity 410, is filled with a liquid 142 such as fluorobenzene or another organic solvent having refractive index matching waveguide segments 112, 114, 112', and 114'. Further, liquid 142 is at a fluid pressure Pe that is less than the vapor pressure Pv of the liquid at an operating temperature T0 of switching site 400. In the exemplary embodiment of switching site 400, the liquid pressure Pe and the operating temperature T0 of the optical switch are such that the critical dimension D0 that determines whether a bubble at the operating temperature T0 collapses is about halfway between the smallest dimension of cavity 116 and the smallest dimension of cavity 420 (e.g., about 13.5 μm.) Accordingly, a bubble that fills optical cavity 410 remains stable at the operating temperature T0 of the optical switch, but the fluid pressure Pe and surface tension collapse any bubble that is in activation cavity 420 or neck 430 and at the operating temperature T0 of the optical switch.

The liquid 142 as described above has an index of refraction matching the index of refraction of waveguide segments 112, 112', 114, and 114'. Accordingly, when cavity 116 is filled with an index-matching liquid as in FIG. 4B, an optical signal OS input through waveguide segment 112 or 114 passes through cavity 116 to the corresponding collinear waveguide segment 112' or 114'.

FIG. 4C illustrates the reflective or activated state of switching sited 400. In the reflective state, optical cavity 410 contains a bubble 414. With bubble 414 in optical cavity 410, an input optical signal OS on waveguide segment 112 or 114 reflects from waveguide/bubble interface 115 into waveguide segment 114 or 112. The reflective state of switching site 400 is stable since the surface tension for a bubble having the size of optical cavity 410 is less than the pressure differential between the vapor pressure Pv and the fluid pressure Pe of the liquid at the operating temperature T0 of switching site 400.

One way to switch switching site 400 from the transparent state of FIG. 4B to the reflective state of FIG. 4C is to locally heat the liquid in optical cavity 410 using heating element

412. A bubble that forms when the liquid in optical cavity 410 reaches the nucleation temperature expands to fill cavity 410. The local heating is shut off after bubble 414 reaches the critical size.

An alternative activation process activates heating elements 422 to locally heat the liquid in activation cavities 420. Heating continues until bubbles from cavities 420 expand into optical cavity 410. Heating can stop when a bubble portion in optical cavity 410 is larger than the critical size. From there, the bubble expands to fill optical cavity 410. Bubbles or portions of bubbles in activation cavities 420 and necks 430 collapse when heating stops since bubbles in cavities 420 and necks 430 are have a confining dimension that is smaller than the critical size. (Heating element 412 is not required and can be omitted if heating elements 422 are used to activate switching site 400.)

FIG. 4D illustrates a deactivation process for switching site 400. With switching site 400 starting in the reflective state of FIG. 4C, the deactivation process turns on heating elements 422 in activation cavities 420. As illustrated in FIG. 4A, heating elements 422 have a higher resistance or faster heating portions furthest from optical cavity 420. A power pulse applied to heating elements 422 thus forms bubbles 424 that begin at the remote ends of activation cavities 420 and expand toward optical cavity 410. Expanding bubbles 424 push liquid 142 into optical cavity 410 faster than the liquid can flow to the reservoir via the gap between the planar lightwave circuit and the underlying substrate. The liquid flow compresses bubble 414 in optical cavity 410, decreasing the size of bubble 414. Inward surface tension forces on bubble 414 correspondingly increase, and absorption of heat and gases from bubble 414 into the surrounding liquid 142 reduces pressure in bubble 414. As a result, bubble 414 collapses.

The position and performance of heating element 422, the duration of the power pulse, and the size of activation cavities 420 and necks 430 are such that bubble 414 collapses before expanding bubbles 424 reach optical cavity 410. In the exemplary embodiment of the invention where optical cavity 410 is about 45×45×15 $\mu m^3$, activation cavities 420 are about 85×45×12 $\mu m^3$ with necks 430 being about 10×45×9 $\mu m^3$, and heating elements 422 are 650-$\Omega$ resistors that output about 210 mW during a time interval of less than about 0.2 ms. Once heating elements 422 are shut off, bubbles 424 collapse because activation cavities 420 have a confining dimension that is smaller that the critical dimension D0 for a stable bubble. The deactivation process thus returns switching site 414 to the transparent state of FIG. 4B.

FIGS. 4A, 4B, 4C, and 4D show an embodiment of the invention having two activation cavities 420 on opposite sides of the optical cavity 410. Many alternative geometries are possible. For example, one activation cavity 420 or three or more activation cavities 420 with associated heating elements 422 may prove most efficient at deactivating a switching site of a particular size or shape. Several suitable shapes for activation cavities are further described below.

Figure 5A:
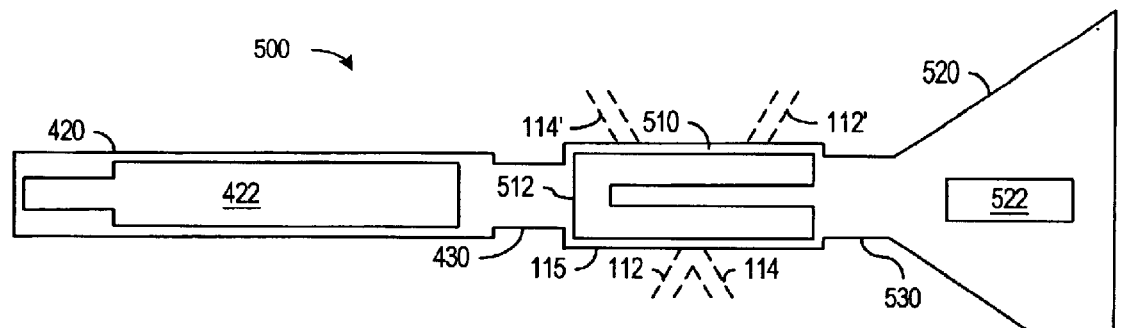
FIGS. 5A, 5B, 5C, 5D, 5E, 5F, 5G, and 5H are plan views respectively illustrating the structure and states of a switching site that pushes a bubble out of the optical cavity to deactivate the switching site.

FIGS. 5A, 5B, 5C, 5D, and 5E illustrate a switching site 500 in accordance with another embodiment of the invention. FIG. 5A shows the structure of switching site 500, which includes an activation cavity 420, an optical cavity 510, and an absorber cavity 520 that are between a planar lightwave circuit and an underlying semiconductor substrate.

Activation cavity 420 has a confining dimension (e.g., width) that is smaller than the critical dimension D0 for a stable bubble at the operating temperature T0 and fluid pressure Pe of switching site 500. In an exemplary embodiment of the invention, activation cavity 420 is 120 $\mu m$ long and 45 $\mu m$ high but only 12 $\mu m$ wide in a pressure/temperature regime where the critical dimension for a stable bubble is about 13.5 $\mu m$. Accordingly, activation cavity 420 is filled with liquid 142 in a stable state without local heating. A heating element 422 fabricated in the semiconductor substrate can provide local heating to create bubbles for initialization, activation, and deactivation of switching site 500.

Optical cavity 510 is larger than the critical dimension D0 for a bubble at the operating temperature T0 and fluid pressure Pe of switching site 500 and in the exemplary embodiment is about 15 $\mu m$ wide, 45 $\mu m$ long, and 45 $\mu m$ high. Optical cavity 510 transmits or reflects optical signals in the same manner as optical cavity 410, having a transparent state when optical cavity 510 is filled with liquid and a reflective state when optical cavity 510 contains a bubble. Optical cavity 510 optionally contains a heating element 512, which can create a bubble in optical cavity 510 to activate switching site 500. Alternatively, heating element 422 in activation cavity 420 can activate switching site 500 using an activation process described below.

A neck 430 between optical cavity 510 and activation cavity and a neck 530 between optical cavity 510 and absorber cavity 520 help confine a bubble in optical cavity 510. Necks 430 and 530 also slow or stop bubbles in respective cavities 420 and 520 from expanding into optical cavity 520. In the exemplary embodiment, neck 420 is about 9 $\mu m$ wide, 45 $\mu m$ high, and 10 $\mu m$ long, and neck 520 is about 12 $\mu m$ wide, 45 $\mu m$ high, and 10 $\mu m$ long.

Absorber cavity 520 is significantly larger than the critical dimension D0 for a bubble at the operating temperature T0 and fluid pressure Pe of switching site 500. In the exemplary embodiment, absorber cavity 520 is sufficiently large so that a large overpressure is required to collapse a bubble in absorber cavity 520. An optional heating element 522 in absorber cavity 520 can heat liquid 142 in absorber cavity 520 to create a bubble 524. Alternatively, if heating element 522 is omitted, heating element 422 in activation cavity 420 and/or heating element 512 (if present) in optical cavity 510 can be left on for a time sufficient to create a bubble that expands into absorber cavity 520.

Figure 5B:
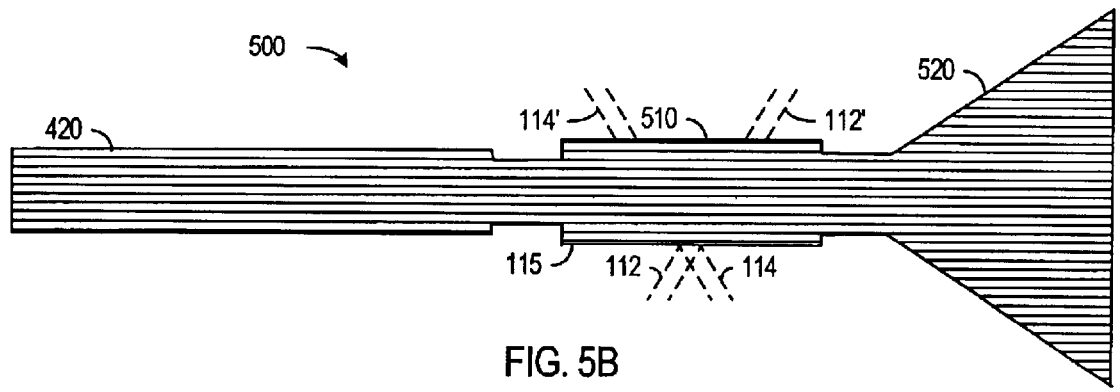
Figure 5C:
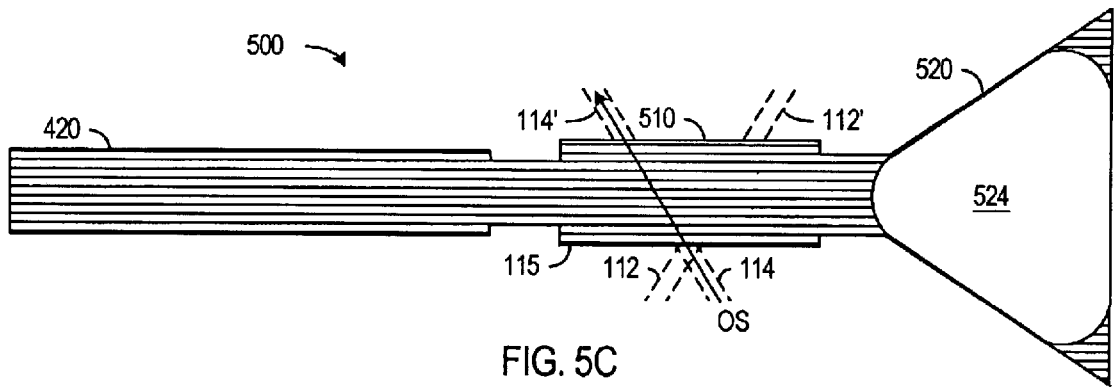

FIG. 5B shows fluid-filled state of switching site 500. The illustrated state in FIG. 5B is a stable transparent state of switching site 500 but is not the preferred reflective state for operation of switching site 500. FIG. 5C illustrates the preferred transparent state that would normally be used during operation of switching site 500. The state of switching site 500 in FIG. 5C differs from the state of FIG. 5B in that absorber cavity 520 contains a bubble 524 in the illustrated state of FIG. 5C.

Bubble 524 can be created in absorber cavity 520 using a variety of techniques. For example, when absorber cavity 520 includes optional heating element 522, an initialization process conducted at power up of the optical switch can activate heating element 522 to locally raise liquid 142 in absorber cavity 520 to the nucleation temperature and create bubble 524. Bubble 524 remains stable in absorber cavity 520 after local heating of absorber cavity 520 during start-up of the optical switch.

Figure 5D:
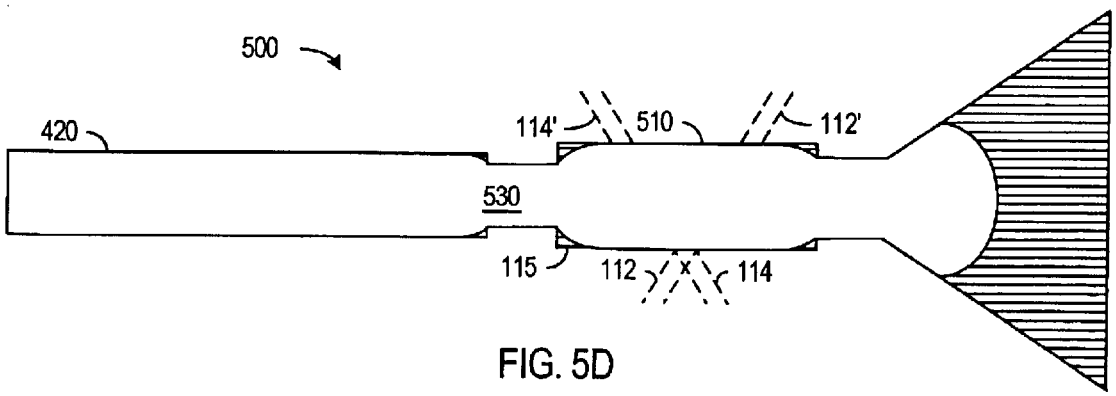
Figure 5E:
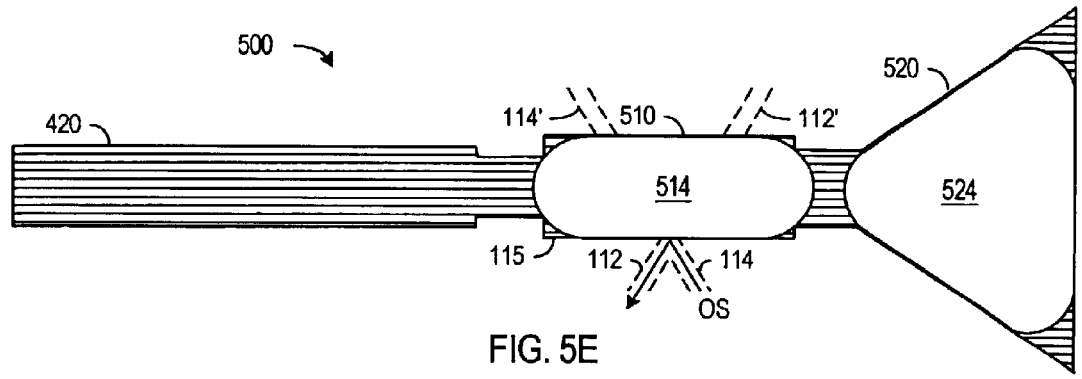

An alternative method for creating bubble 524 uses heating element 422 in activation cavity 420 and/or optional heating element 512 in optical cavity 510 to create bubble 524. In particular, an initialization process can activate heating element 422 (and heating element 512) to create a bubble 530, which expands from activation cavity 420 through optical cavity 510 into absorber cavity 520 as shown in FIG. 5D. Local heating can stop once the portion of bubble 530 in absorber cavity 520 reaches the critical size. Bubble 530 then cools to operating temperature T0 causing the collapse of portions of bubble 530 that are in activation cavity 420, neck 430, and neck 530, which have widths that are smaller than the critical dimension D0. This initialization process thus leaves switching site 500 in a reflective state having a stable bubble 514 in optical cavity 510 and a stable bubble 524 in absorber cavity 520 as illustrated in FIG. 5E. The state of switching site 500 in FIG. 5E is a stable reflective state that requires no local heating.

Figure 5F:
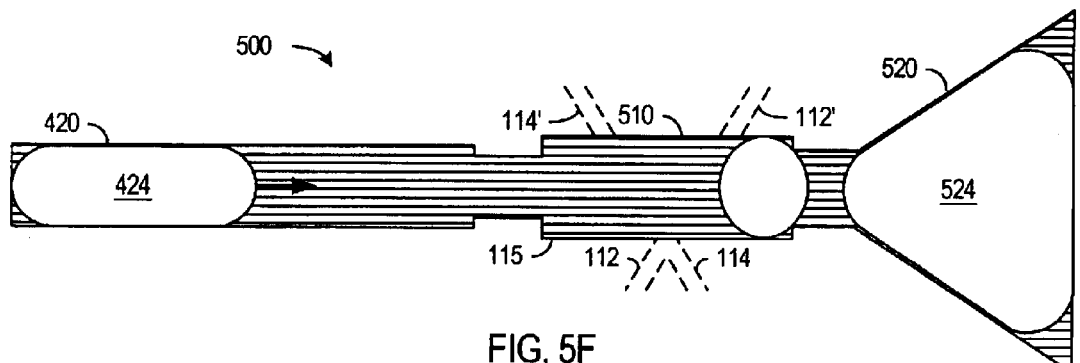
Figure 5G:
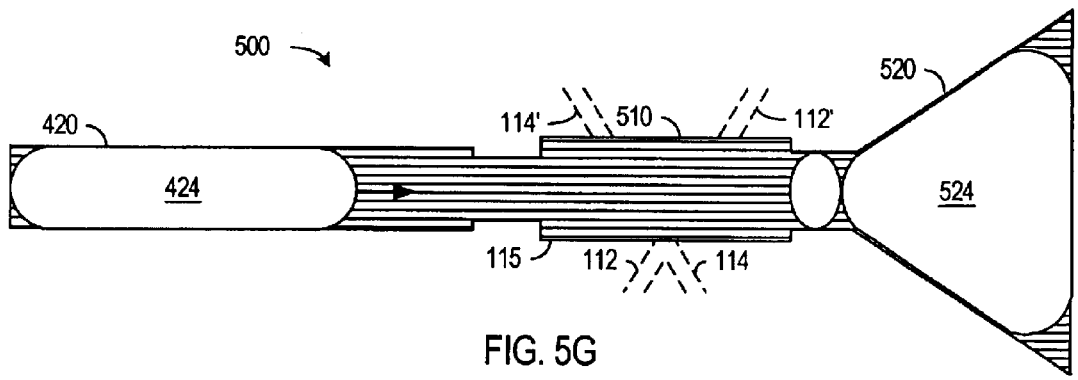

FIGS. 5F and 5G illustrate a deactivation process that changes switching site 500 from the reflective state of FIG. 5E to the transparent state of FIG. 5C. The deactivation operates heating element 422 in activation cavity 420 to create a rapidly expanding bubble 424. Expanding bubble 424 creates a fluid flow that compresses bubble 514 and pushes bubble 514 toward absorber cavity 520. Bubble 524 being in absorber cavity 520 facilitates the fluid flow toward absorber cavity 520 since gas in bubble 524 is easily compressed when compared to the surrounding liquid 142.

As bubble 514 compresses, vapor from bubble 514 condenses into liquid 142 and bubble 514 begins to collapse. However, in addition to the vapor from liquid 142, bubble 514 may contain other gases, e.g., nitrogen and oxygen from air, that may be dissolved in liquid 142. Condensation of the vapor back into liquid 142 is a more rapid process than is absorption of other gases. As shown in FIG. 5G, if a portion of bubble 514 does not collapse quickly enough, the fluid flow from expanding bubble 424 pushes that portion of bubble 514 through neck 530 into absorber cavity 520. The remainder of bubble 514 merges with bubble 524 in absorber cavity 520. The deactivation process stops local heating before bubble 424 expands into optical cavity 510.

Bubble 424 then collapses, leaving switching site 500 in the transparent state of FIG. 5C. Bubble 524, including the newly added gases from bubble 514, can reach equilibrium with liquid 142 over a period of time (e.g., 500 ms) that is much longer than the switching time (e.g., about 1 ms).

Figure 5H:
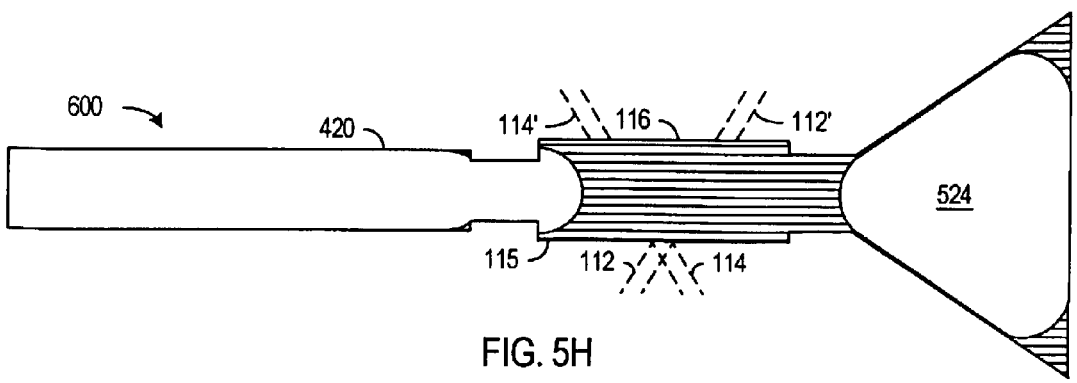

FIG. 5H illustrates an activation process switches switching site 500 from the transparent state of FIG. 5C back to the reflective state of FIG. 5E. The activation process of FIG. 5H operates heating element 422 in activation cavity 420 for a period of time sufficient for the bubble 424 created in activation cavity 420 to expand into optical cavity 510. Once the portion bubble 424 in optical cavity 510 has the critical size, the activation process can stop local heat. As a result, the portion of bubble 424 in the narrow activation cavity 420 collapses, leaving the portion in optical cavity 510 to expand to fill optical cavity 510. With the activation process of FIG. 5H, heating element 512 is not required and the density of heating elements in the switching site can be reduced.

Figure 6A:
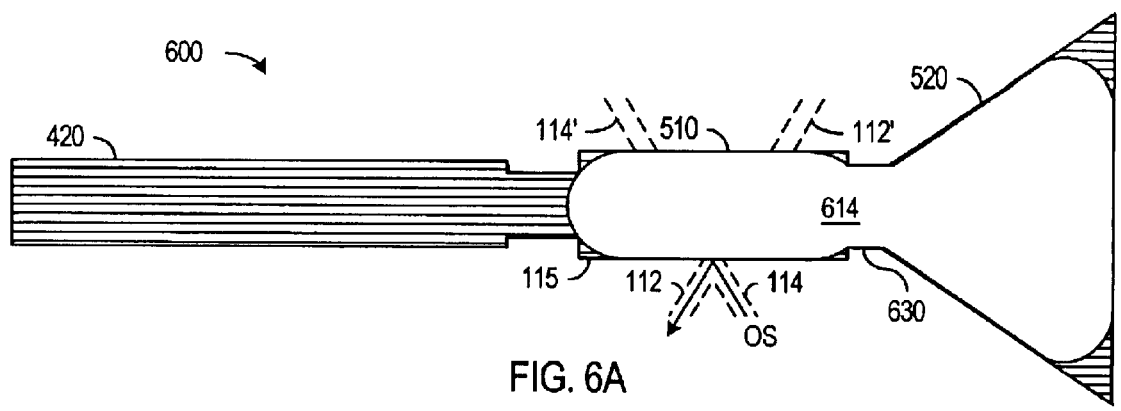
FIGS. 6A, 6B, 6C, and 6D are plan views illustrating operation of a switching site having a reflective state in which a single bubble fills optical and absorber cavities.

FIGS. 6A, 6B, 6C, and 6D illustrate a switching site 600, which is similar to switching site 500. Switching site 600 differs from switching site 500 in that a neck 630, which is between optical cavity 510 and absorber cavity 520 in switching site 600, is such that when switching site 600 is in the reflective state a single bubble 614 fills optical cavity 510 and absorber cavity 520 as illustrated in FIG. 6A. Neck 630 (like neck 530, which is between optical cavity 510 and absorber cavity 520 in switching site 500) is narrower than the critical dimension for a stable bubble, but neck 630 is shorter or wider than neck 530.

Figure 6B:
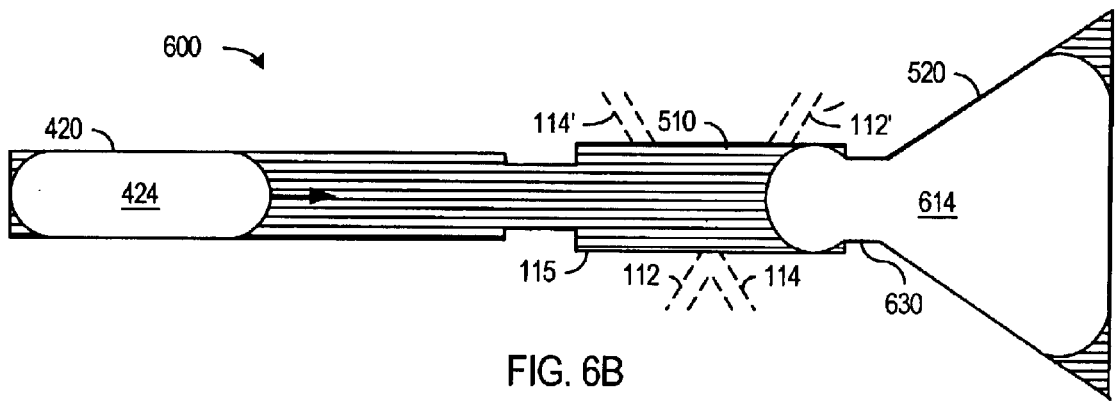
Figure 6C:
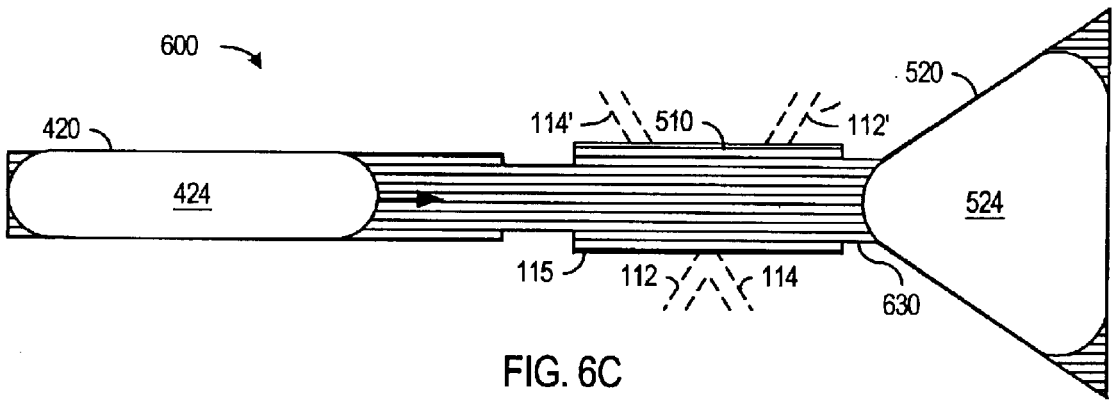
Figure 6D:
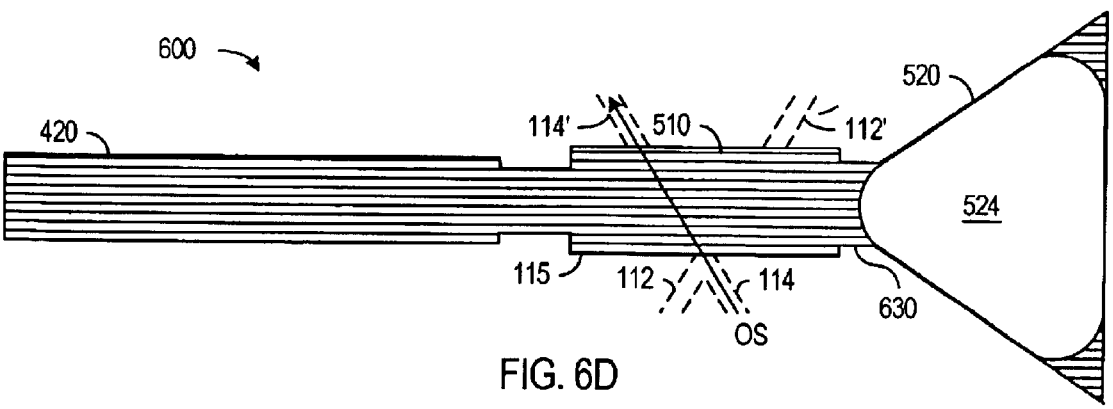

FIGS. 6B and 6C illustrate a deactivation process that switches switching site 600 from the reflective state of FIG. 6A to the transparent state of FIG. 6D. The deactivation process turns on the heating element in activation cavity 420 to create a bubble 424. Bubble 424 expands locally increasing fluid pressure and causing a fluid flow into optical cavity 510. The local pressure increase and associated fluid flow partially collapse a portion of bubble 614 that was in optical cavity 510 and pushes any remaining gases from optical cavity 510 into absorber cavity 520. Since the bubble 614 extends through neck 630, the forces pushing the gases out of optical cavity 510 are not required to overcome the surface tension of a liquid barrier that resides in neck 530 of switching site 500 (FIG. 5E).

Once optical cavity 520 is filled with liquid, heating stops, and bubble 424 in activation cavity 420 collapses. Neck 630, being narrower than the critical dimension, confines bubble 524 to absorber cavity 520 as shown in FIG. 6D.

The above embodiments of the invention describe switching sites having a few specific geometries for activation cavities. Many other arrangements of activation cavities are possible.

Figure 7A:
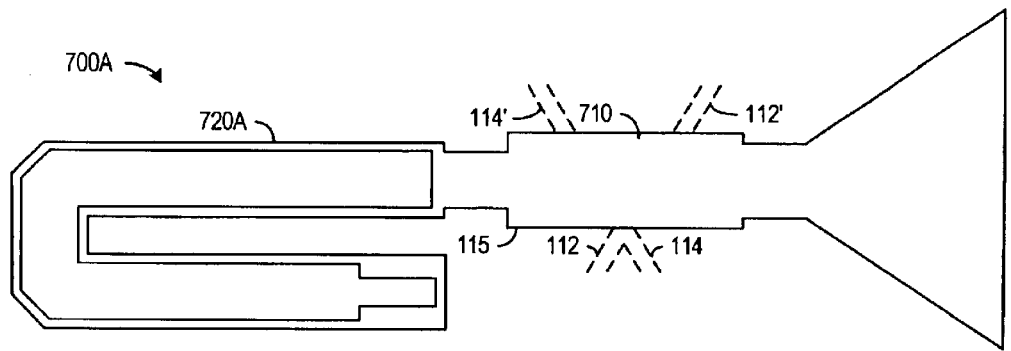
FIGS. 7A, 7B, 7C, 7D, and 7E illustrate some alternative geometries for activation cavities that create bubbles and/or fluid flows for initialization, activation, and/or deactivation of switching sites in accordance with embodiments of the invention.

FIG. 7A illustrates a switching site 700A in which an activation cavity 720A is curved to provide a greater length for bubble expansion toward an optical cavity 710 during the deactivation process.

Figure 7B:
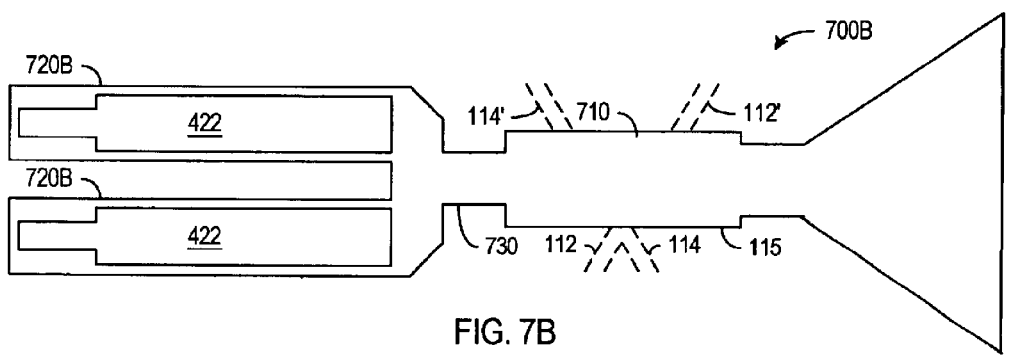

FIG. 7B illustrates an example of a switching site 700B having a pair of activation cavities 720B in fluid communication with optical cavity 710 via a single neck 730. The configuration of multiple activation cavities 720A can provide greater fluid flow and compressive force with all of the activation cavities having widths that are narrower than the critical dimension.

Figure 7C:
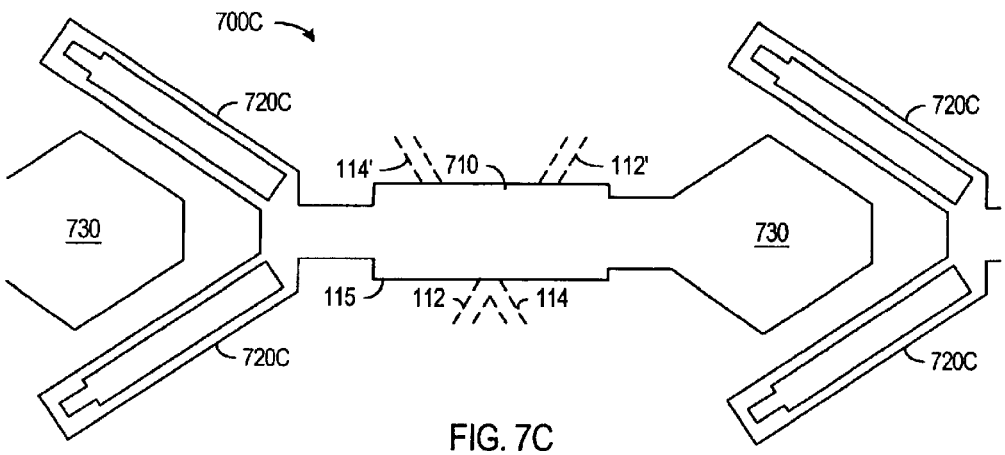

FIG. 7C illustrates a switching site 700C that also has a pair of activation cavities 720C in fluid communication with optical cavity 710 via a single neck 730. However, in switching site 700C activation cavities 720C are at an angle that provides area for an absorber cavity 740 of an adjacent switching site. Switching sites 700C can accommodate a fine pitch for switching sites in an optical switch.

Figure 7D:
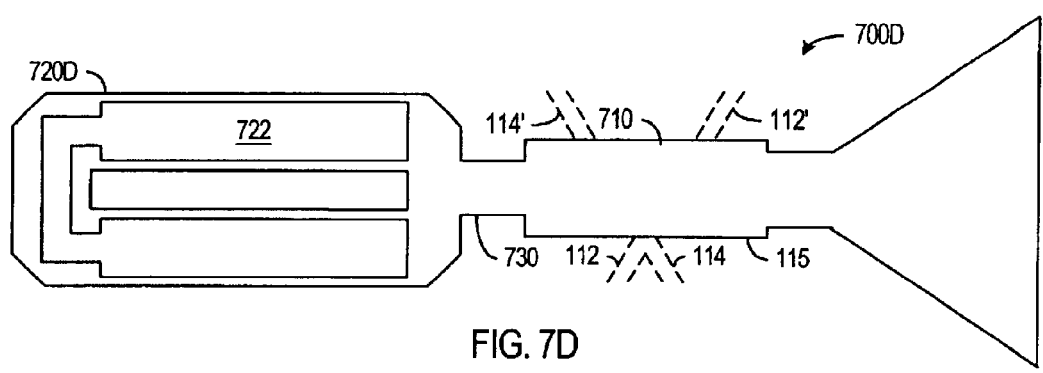

FIG. 7D illustrates a switching site 700D in which an activation cavity 720D forms a loop containing a single heating element 722. A portion of heating element 722 that is furthest from optical cavity 710 heats fastest to create a bubble at one end of the loop that expands along both sides of the loop heading toward optical cavity 710.

Figure 7E:
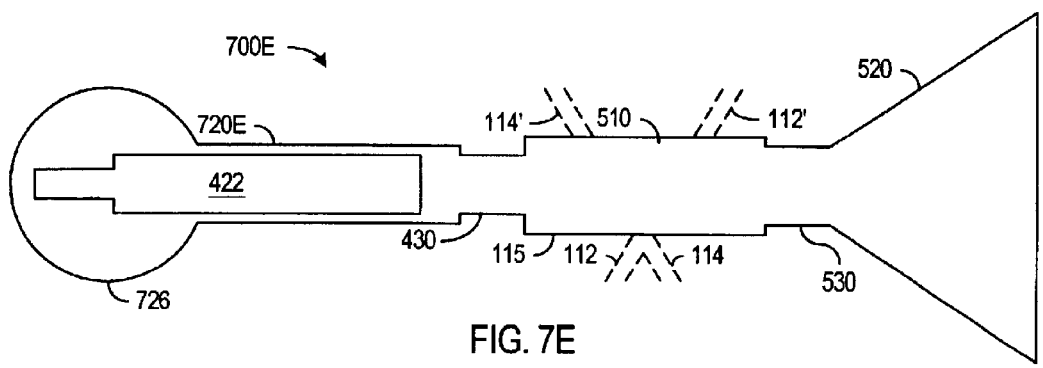

FIG. 7E illustrates a switching site 700E having an activation cavity 720E with an end 726 large enough to contain a stable bubble at the operating temperature and pressure of the liquid in an optical switch. An initialization or power up process for the optical switch would create a bubble (not shown) at end 726 of activation cavity 720E. The bubble would then remain stable in end 726 without the need for local heating. With a stable bubble at the end 726 of activation cavity 720E, a deactivation process for switching site 720E turns on heating element 422 to increases the temperature of the existing bubble. The bubble then expands causing a local pressure increase and a fluid flow from activation cavity 720E into optical cavity 510. The deactivation process does not need to create a bubble or raise the liquid over the homogeneous nucleation temperature. As a result, the expansion of the bubble in activation cavity 740E and the resulting pressure increase and fluid flow into optical cavity 510 are more easily controlled.

Although the invention has been described with reference to particular embodiments, the description is only an example of the invention's application and should not be taken as a limitation. In particular, the specific geometries for switching sites described above are merely examples that illustrate particular features, and a variety of other suitable configurations in accordance with the invention are possible. Various other adaptations and combinations of features of the embodiments disclosed are within the scope of the invention as defined by the following claims.

What is claimed is:

1. An optical switch comprising:
    an optical structure containing crossing light paths with optical cavities at intersections of the light paths;
    a liquid having an index of refraction matching an index of refraction of the light paths, wherein the liquid is in communication with the optical cavities, the liquid in the optical structure having a pressure and a temperature such that a bubble intentionally created in one of the optical cavities for switching of a light beam is stable at the temperature of the liquid; and
    a plurality of activation structures, wherein each of the activation structures has a corresponding optical cavity and is operable to switch the optical cavity from a first state in which the optical cavity contains a bubble to a second state in which the optical cavity is filled with the liquid, each activation structure comprising:
    an activation cavity formed in the optical structure in fluid communication with the liquid and the corresponding optical cavity, wherein each activation cavity has a minimum dimension that is too small to permit the activation cavity to contain a stable bubble at the temperature of the liquid; and
    a heating element in the activation cavity.

2. The optical switch of claim 1, wherein a difference between the pressure of the liquid and a vapor pressure of the liquid at the temperature of the liquid in the optical structure is greater than a surface tension induced pressure change across a bubble substantially filling one of the optical cavities.

3. The optical switch of claim 2, further comprising a fluid channel that is filled with the liquid and is in fluid communication with the optical cavities.

4. The optical switch of claim 3, wherein the difference between the pressure and the vapor pressure of the liquid is less than a surface tension induced pressure change across a bubble having a size corresponding to a dimension of the fluid channel.

5. The optical switch of claim 1, wherein the optical structure is at the temperature of the liquid.

6. The optical switch of claim 4, wherein the liquid fills one or more of the optical cavities, and one or more bubbles at the temperature of the liquid are in one or more of the optical cavities.

7. The optical switch of claim 6, further comprising a mechanism for globally increasing the pressure of the liquid to a level that collapses the one or more bubbles in the optical cavities.

8. The optical switch of claim 1, wherein each activation structure operates to move the liquid into the corresponding optical cavity.

9. The optical switch of claim 1, wherein each activation cavity has an end that is away from the corresponding optical cavity, the end being large enough to contain a bubble that is stable at the temperature and the pressure of the liquid in the optical structure.

10. The optical switch of claim 1, further comprising connecting necks formed in the optical structure, each connecting neck being between a corresponding one of the activation cavities and the optical cavity that corresponds to the activation cavity, wherein the necks are narrower than the activation cavities.

11. The optical switch of claim 1, wherein for each activation structure, operation of the heating element for a first period of time moves liquid from the activation cavity to the corresponding optical cavity, locally increasing pressure to collapse a bubble in the corresponding cavity.

12. An optical switch comprising:
    an optical structure containing cross light paths with optical cavities at intersections of the light paths;
    a liquid having an index of refraction matching an index of refraction of the light paths, wherein the liquid is in communication with the optical cavities, the liquid in the optical structure having a pressure and a temperature such that a bubble intentionally created in one of the optical cavities for switching of a light beam is stable at the temperature of the liquid; and
    a plurality of activation structures, wherein each of the activation structures has a corresponding optical cavity and is operable to switch the optical cavity from a first state in which the optical cavity contains a bubble to a second state in which the optical cavity is filled with the liquid, each activation structure comprising:
    an activation cavity formed in the optical structure in fluid communication with the liquid and the corresponding optical cavity; and
    a heating element in the activation cavity, wherein for each activation structure,
    operation of the heating element for a first period of time moves liquid from the activation cavity to the corresponding optical cavity, locally increasing pressure to collapse a bubble in the corresponding cavity, and
    operation of the heating element for a second period that is longer than the first period, moves vapor from the activation cavity to the corresponding optical cavity, creating a bubble that is stable in the corresponding optical cavity.

13. An optical switch comprising:
    an optical structure containing crossing light paths with optical cavities at intersections of the light paths;
    a liquid having an index of refraction matching an index of refraction of the light paths, wherein the liquid is in communication with the optical cavities, the liquid in the optical structure having a pressure and a temperature such that a bubble in one of the optical cavities is stable at the temperature of the liquid; and
    a plurality of activation structures, wherein each of the optical cavities has a corresponding activation structure that is operable to switch the optical cavity from a first state in which the optical cavity contains a bubble to a second state in which the optical cavity is filled with the liquid, wherein each activation structure comprises:
    an activation cavity formed in the optical structure in fluid communication with the liquid and the corresponding optical cavity;
    a heating element in the activation cavity; and
    an absorber cavity in fluid communication with the liquid and the corresponding optical cavity.

14. The optical switch of claim 13, wherein for each activation structure, operation of the heating element for a first period of time moves liquid from the activation cavity to the corresponding optical cavity, locally increasing pressure to partially collapse a bubble in the corresponding optical cavity and push a remainder of the bubble into the absorber cavity of the activation structure.

15. The optical switch of claim 13, wherein each of the absorber cavities has a size and shape sufficient to contain a stable bubble at the temperature of the liquid.

16. The optical switch of claim 13, wherein each of the absorber cavities contains a stable bubble at the temperature of the liquid.

17. The optical switch of claim 13, further comprising heating elements respectively in the absorber cavities.

18. The optical switch of claim 13, wherein in the first state of the optical cavity, the bubble in the optical cavity extends into the absorber cavity.

19. An optical switch comprising:
an optical structure including;
an optical cavity at intersections of light paths;
an activation cavity adjacent the optical cavity;
a fluid path between the activation cavity and the optical cavity;
an absorber cavity; and
a fluid path between the absorber cavity and the optical cavity;
a liquid in communication with the optical cavity and the activation cavity; and
a heating element in the activation cavity, wherein the heating element is operable to switch the optical cavity from a first state in which the optical cavity contains a bubble and a second state in which the optical cavity is filled with the liquid.

20. The optical switch of claim 19, wherein operation of the heating element when the optical cavity is in the first state creates an expanding bubble in the activation cavity causing a fluid flow from the activation cavity into the optical cavity, the fluid flow pushing a portion of the bubble in the optical cavity from the optical cavity into the absorber cavity.

21. The optical switch of claim 19, wherein in the first state of the optical cavity, the bubble in the optical cavity extends into the absorber cavity.

22. The optical switch of claim 19, wherein the liquid in the optical structure has a pressure and a temperature such that a bubble in the optical cavity is stable at the temperature of the liquid.

23. An optical switch comprising:
an optical structure containing an optical cavity at intersections of light paths, an activation cavity adjacent the optical cavity, and a fluid path between the activation cavity and the optical cavity;
a liquid in communication with the optical cavity and the activation cavity; and
a heating element in the activation cavity, wherein the heating element is operable to switch the optical cavity from a first state in which the optical cavity contains a bubble and a second state in which the optical cavity is filled with the liquid and operable to switch the optical cavity from the second state to the first state, wherein:
the liquid in the optical structure has a pressure and a temperature such that a bubble in the optical cavity is stable at the temperature of the liquid
the activation cavity has an end that is large enough to contain a bubble that is stable at the pressure and the temperature of the liquid in the optical structure.

24. A method for operating an optical switch, comprising:
filling a cavity that is at an intersection of a first light path and a second light path with a liquid;
creating a bubble in the cavity;
maintaining the liquid at a first pressure that is less than a vapor pressure of the liquid at a temperature of the liquid, wherein the bubble in the cavity is stable at the temperature of the liquid; and
creating a fluid flow that pushes the bubble out of the cavity, leaving the cavity filled with the liquid.

25. The method of claim 24, wherein creating the bubble comprises temporarily heating the liquid to overcome a nucleation energy of the liquid and create a bubble in the cavity, wherein the first pressure of the liquid is such that the bubble remains stable at the temperature of the liquid after heating stops.

26. The method of claim 25, wherein heating heats the liquid in the cavity to create the bubble.

27. A method for operating an optical switch, comprising:
filling a cavity that is at an intersection of a first light path and a second light path with a liquid;
creating a bubble in the cavity; and
maintaining the liquid at a first pressure that is less than a vapor pressure of the liquid at a temperature of the liquid, wherein the bubble in the cavity is stable at the temperature of the liquid, and wherein
creating the bubble comprises temporarily heating the liquid to overcome a nucleation energy of the liquid, wherein heating heats the liquid adjacent the cavity and vapor resulting from the heating expands into the cavity to create the bubble in the cavity, and the first pressure of the liquid is such that the bubble remains stable at the temperature of the liquid after heating stops.

28. A method for operating an optical switch, comprising:
filling a cavity that is at an intersection of a first light path and a second light path with a liquid;
maintaining the liquid at a first pressure that is less than a vapor pressure of the liquid at a temperature of the liquid;
creating a bubble in the cavity, wherein creating the bubble comprises temporarily heating the liquid to overcome a nucleation energy of the liquid and create a bubble in the cavity, wherein the first pressure of the liquid is such that the bubble remains stable at the temperature of the liquid after heating stops;
temporarily increasing pressure of the liquid in the cavity to a second pressure that collapses the bubble in the cavity; and then
dropping the liquid back to the first pressure, wherein the cavity remains filled with the liquid after the liquid drops back to the first pressure.

29. The method of claim 28, wherein temporarily increasing the pressure comprises increasing fluid pressure in a reservoir that contains the liquid and is in fluid communication with a plurality of cavities at intersections of light paths.

30. The method of claim 28, wherein temporarily increasing the pressure comprises locally increasing fluid pressure in the cavity without changing fluid pressure in other cavities of the optical switch.

31. The method of claim 28, wherein temporarily increasing the pressure in the cavity comprises heating the liquid to create a bubble that causes a fluid flow into the cavity.

* * * * *